United States Patent Office 3,654,214
Patented Apr. 4, 1972

3,654,214
DISUBSTITUTED UREAS AND THOUREAS AS STABILIZERS FOR OIL-EXTENDED UNVULCANIZED BUTADIENE-STYRENE COPOLYMERS
Joseph A. Beckman, Akron, Ohio, assignor to The Firestone Tire & Rubber Company, Akron, Ohio
No Drawing. Filed Aug. 8, 1969, Ser. No. 848,733
Int. Cl. C08f 45/60
U.S. Cl. 260—33.6 AQ                9 Claims

ABSTRACT OF THE DISCLOSURE

An unvulcanized rubbery copolymer of butadiene and styrene, whether or not interconnected, is stabilized by a urea or thiourea in which one of the nitrogen groups is substituted by an aryl group and the other is substituted by either an aryl group or an aliphatic group.

---

The invention relates to stabilizers for rubbery copolymers of butadiene and styrene, whether or not the polymer is interconnected, and more particularly the rubbery stereo-regular copolymers, and especially the stereoregular copolymers of butadiene and styrene which have been oil-diluted.

The stabilizer is a urea or thiourea, one of the nitrogens of which has been substituted by an aromatic group and the other nitrogen of which has been substituted by an aromatic or aliphatic group. Whether the stabilizer be a urea or thiourea derivative, the aromatic substituent may be phenyl, tolyl, xylyl or naphthyl, and the aliphatic substituent may be an alkyl group of 1 to 10 carbon atoms or more, or a cycloalkyl group of 5 to 12 carbon atoms, pyridyl, morpholyl, benzyl, methyl benzyl or ethyl benzyl. The stabilizers may be of the bis type derived for example from xylene diamine or a Duomeen (for example, N-cocopropanediamine) and the polymethylene diamines, etc.

From 0.005 to 5 phr. (parts per 100 parts of polymer) of stabilizer will be used, and preferably 0.1 to 2 parts.

Unvulcanized interconnected butadiene-styrene copolymers are those in which the viscosity and molecular weight have been jumped or otherwise substantially increased by reaction of the initially produced linear copolymer with a suitable reagent to increase the molecular weight and at the same time the branching of the copolymer. One type of such reaction is examplified by the reaction of silicon tetrachloride with a live butadienestyrene copolymer produced by a lithium-based catalyst (e.g., butyllithium or tetramethylene dilithium), the interconnected polymer containing a silicon atom in the center with four hydrocarbon polymer fragments extending therefrom to form a "star." Another type of such interconnecting reaction, termed "jumping," is exemplified by the procedure described by E. F. Engel et al., Rubber Age, December 1964, pages 410–415. The copolymer may be jumped by treatment with a two-part catalyst consisting of a Friedel-Crafts catalyst plus a cocatalyst, such as titanium tetrachloride and thionylchloride or ethylaluminum sesquichloride and water.

Another type of molecular-weight-increasing-reaction, or interconnecting (jumping) reaction, is exemplified by the reaction of an olefinically unsaturated rubbery butadiene-styrene copolymer with a halogenated organic compound (e.g. ethylene dichloride) in the presence of a strong base (e.g. butyllithium) to produce a mixture of higher molecular weight rubbery copolymers of branched construction, and, typically, exemplified by a mixture of copolymers having a molecular weight distribution including the original molecular weight of the unreacted rubbery copolymer to molecular weight of dimers, trimers, tetramers and higher copolymers of the original rubbery polymer. All of these copolymers of increased molecular weight contemplated by the invention have improved ability to accept diluting oil and possess good milling and extruding properties ("processing" properties) when diluted with oil. From 10 to 100 parts of processing oil, or thereabout may be added to 100 parts of the copolymer.

Difficulty has been experienced in stabilizing many oil-diluted rubbery copolymers. For this reason, the tests reported below were all made on oil-diluted copolymers. The stabilizer of this invention provides excellent stabilization of unvulcanized oil-diluted interconnected rubbery copolymers, i.e. an unvulcanized linear rubbery copolymer which has been interconnected and oil diluted. The invention finds widest use in the stabilization of such copolymers of butadiene and styrene.

Any of the oils commonly used in the dilution of rubbers can be employed, including particularly higher boiling petroleum fractions such as the commercially known naphthenic and aromatic mineral oils. In the dilution of rubbers with oils, about 37.5 parts of oil are customarily used with 100 parts of copolymer, although the amount of oil can vary from 10 to 100 parts, more or less. The oil preferably is added to the copolymer after the polymerization and interconnecting reactions are completed. The stabilizer can be added prior to the addition of the oil, it can be added with the oil, or it can be added soon thereafter.

The stabilizer is incorporated into the copolymer in the usual manner. The stabilizing effect is recognized by the lessening of the decrease in the viscosity of the copolymer on heating aging. The stabilizers are added to protect the copolymer during storage and processing. The degree of stabilization required depends largely upon the temperature at which the copolymer is stored and processed. The vulcanizates are useful wherever rubber vulcanizates have been employed, as in the manufacture of tires, hose, and a wide variety of products.

The copolymer used in the tests recorded in the following tables was prepared by solution polymerization of butadiene and styrene. A cement-oil masterbatch was prepared containing 37.5 parts of processing oil per 100 parts of copolymer, and the stabilizers of this invention were added to portions of the masterbatch to produce the samples for aging studies.

Some of the masterbatch samples were desolventized on a drum drier. Each dried copolymer masterbatch sample was milled to achieve homogeniety and samples of the appropriate size were cut from each of the milled polymers. Other masterbatch samples were desolventized by dumping in hot water and are referred to below as water-desolventized. A Mooney viscosity (ML/4/100°

C.) determination was made on each sample prior to aging. Samples containing the various stabilizers were then aged in a forced air oven at 75° C. for various periods of time. The results obtained with the different stabilizers of this invention are recorded in the following tables. The effect of the aging is indicated by changes in the Mooney viscosity (ML/4/100° C.) of the various samples after aging for several days.

Some of the stabilizers are commercially available. All of them may be prepared according to the following reaction, well known for the preparation of ureas and thioureas:

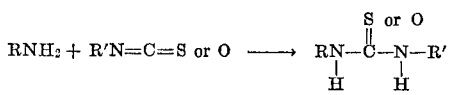

in which R is an aliphatic group of the class consisting of alkyl groups of 1 to 10 carbon atoms, cycloalkyl groups of 5 to 12 carbon atoms, pyridyl, morpholyl, benzyl, methyl benzyl and ethyl benzyl and R' is of the class consisting of such aliphatic groups and an aromatic group of the class consisting of phenyl, tolyl, xylyl and naphthyl.

The preparation of ureas by this general method is disclosed in an article by Bruce W. Hotten entitled Benzyl Ureas as Antioxidants for Hydrocarbons found in Volume 6, No. 4 in Industrial Engineering Chemistry (Product, Research and Development) for December 1967, pages 243–246.

In the following tables the various compounds are identified by code numbers as follows:

Code No.:
A ____ 1-phenyl-3-(4-pyridylmethyl)urea.
B ____ α,α'-Bis-(3-phenylureido)xylene.
C ____ 1-phenyl-3-α-methylbenzyl urea.
D ____ α,α'-Bis-(3-phenylthioureido)xylene.
E ____ 1-phenyl-3-(3-methylbenzyl)urea.
F ____ 1-phenyl-3-(4-methylbenzyl)urea.
G ____ 1-phenyl-3-(3-methylbenzyl)thiourea.
H ____ 1-phenyl-3-(4-methylbenzyl)thiourea.
I ____ Bis-n-phenylthiourea of Duomeen C.
J ____ 1-phenyl-3-[2-(2,4,4-trimethylpentyl)]thiourea.
K ____ 1-cyclohexyl-3-phenylthiourea.
L ____ N-phenylthiourea of Duomeen C.

TABLE I

| Drum dried stabilizer | Amount, phr. | Percent ml./4/100° C. retention after days aging at 75° C. in a forced air oven | | | |
|---|---|---|---|---|---|
| | | 1 day | 2 days | 3 days | 4 days |
| None | | | 90.5 | | 79.0 |
| Control* | | | 98.0 | | 96.0 |
| A | 0.5 | 103.5 | 101.8 | 101.8 | 100.0 |
| B | 0.5 | 96.4 | 92.9 | 91.2 | 85.7 |

*0.5 phr. Santoflex 13 (N-alkyl-N'-aryl-p-phenylenediamine) plus 0.5 phr. oleic acid.

TABLE II

| Drum dried stabilizer | Amount, phr. | Percent ml./4/100° C. retention after days aging at 75° C. in a forced air oven | | | |
|---|---|---|---|---|---|
| | | 2 days | 4 days | 6 days | 8 days |
| None | | 98.4 | 94.8 | 89.9 | 77.9 |
| Control* | | 108.0 | 96.1 | 102.0 | 98.0 |
| A | 0.5 | 112.0 | 106.8 | 115.5 | 112.0 |
| C | 0.5 | 101.9 | 94.5 | 85.3 | 83.6 |
| D | 0.5 | 111.0 | 114.2 | 117.5 | 115.8 |

*0.5 phr. Santoflex 13 (N-alkyl-N'-aryl-p-phenylenediamine) plus 0.5 phr. oleic acid.

TABLE III

| Water desolventized Stabilizer | Amount, phr. | Percent ml./4/100° C. retention after days aging at 75° C. in a forced air oven | | | |
|---|---|---|---|---|---|
| | | 2 days | 4 days | 6 days | 8 days |
| None | | 50.6 | 43.0 | 45.2 | 44.1 |
| Control* | | 70.8 | 59.4 | 52.1 | 60.4 |
| E | 0.5 | 82.3 | 69.4 | 61.4 | 55.5 |
| F | 0.5 | 75.4 | 60.0 | 50.5 | 54.4 |
| None | | 78.9 | 73.7 | 64.0 | 64.0 |
| Control* | | 83.9 | 70.1 | 57.4 | 65.6 |
| G | 0.5 | 98.0 | 100.0 | 96.0 | 99.0 |
| H | 0.5 | 100.0 | 98.9 | 95.7 | 98.8 |
| None | | 63.4 | 54.4 | 60.0 | 55.5 |
| Control* | | 81.6 | 62.1 | 64.4 | 64.4 |
| I | 0.5 | 103.0 | 97.8 | 102.2 | 102.2 |
| I | 0.1 | 104.5 | 77.8 | 76.7 | 71.1 |
| None | | 71.8 | 56.0 | 58.6 | 56.5 |
| Control* | | 67.8 | 59.3 | 59.1 | 65.5 |
| I | 0.5 | 102.0 | 102.9 | 100.0 | 94.4 |
| I | 0.25 | 103.9 | 70.4 | 74.1 | 61.1 |
| I | 0.1 | 80.0 | 54.6 | 58.6 | 52.7 |
| J | 0.5 | 105.0 | 166.4 | 57.2 | 49.0 |
| K | 0.5 | 100.0 | 98.2 | 98.2 | 100.0 |
| None | | 71.8 | 56.0 | 58.6 | 56.5 |
| Control* | | 67.8 | 59.3 | 59.1 | 65.5 |
| L | 0.5 | 101.0 | 99.0 | 61.0 | 47.5 |
| L | 0.25 | 98.2 | 87.7 | 73.0 | 56.5 |
| L | 0.1 | 79.0 | 71.4 | 64.0 | 57.0 |

*0.5 phr. Santoflex 13 (N-alkyl-N'-aryl-p-phenylenediamine) plus 0.5 phr. oleic acid.

The amounts of stabilizers used are given in the tables as "phr.," meaning "parts per 100 parts of polymer."

The stabilized oil-diluted copolymers of the invention are useful in practically every instance in which oil-diluted rubbery polymers have been useful, including, without limitation, use in pneumatic tire treads, sidewalls and carcass stocks. Also the stabilized copolymers of the invention can be blended with other known polymers to provide useful commercial compositions for fabrication into useful shapes and articles. The stabilized copolymers of the invention are advantageously blended with known rubbers (e.g., natural rubber, polybutadienes, polyisoprenes, butadiene-styrene copolymer, isoprene-isobutylene copolymer, polychlorprene, isoprene-styrene copolymer) with or without additional oils, for forming vulcanizates of great technical importance. The novel stabilized copolymers are advantageously mixed with the known reinforcing carbon blacks to produce useful commercial stocks, which also can contain one or more additional rubbery polymers, and also can contain 5 to 100 phr. of additional oil or plasticizer. Sulfur and other known vulcanizing agents for natural rubber and the commercial synthetic rubbers are useful for forming vulcanizable stocks containing the novel stabilized copolymer. Known methods of mixing, forming, fabricating and curing or vulcanizing compositions of natural and commercial synthetic rubbers are applicable to and useful with compositions containing the novel stabilized copolymers of the invention. The novel copolymers are especially useful in pneumatic tire tread, sidewall and carcass compositions, and the considerations of this paragraph are especially relevant to the use of the novel copolymers in tires.

I claim:
1. A copolymer of butadiene and styrene, which (1) is extended with 10 to 100 parts of processing oil per 100 parts of the polymer (2) is unvulcanized, and (3) is stabilized with 0.005 to 5 parts per 100 parts of the copolymer of a disubstituted urea or disubstituted thiourea substituted on one of the nitrogens with aromatic substituent selected from the group consisting of phenyl, tolyl, xylyl and naphthyl, and on the other nitrogen with a substituent selected from the group class consisting of said aromatic substituents, an alkyl group of 1 to 10 carbon atoms, cycloalkyl groups of 5 to 12 carbon atoms, pyridyl, morpholyl, benzyl, methyl benzyl and ethyl benzyl.

2. The stabilized copolymer of claim 1 in which an aromatic substituent of the stabilizer is phenyl.

3. The stabilized copolymer of claim 1 in which an aromatic substituent of the stabilizer is xylyl.

4. The stabilized copolymer of claim 1 in which the aliphatic substituent of the stabilizer is methyl benzyl.

5. The stabilized copolymer of claim 1 in which the aliphatic substituent of the stabilizer is N-coco-propanediamine.

6. The stabilized copolymer of claim 1 in which the stabilizer is 1-phenyl-3-(4-pyridylmethyl)urea.

7. The stabilized copolymer of claim 1 in which the stabilizer is α,α'-bis-(3-phenylthioureido)xylene.

8. The stabilized copolymer of claim 1 in which the stabilizer is bis-n-phenylthiourea of N-coco-propanediamine.

9. The stabilized copolymer of claim 1 in which the stabilizer is 1-cyclohexyl-3-phenylthiourea.

References Cited

UNITED STATES PATENTS

| | | | |
|---|---|---|---|
| 2,444,881 | 7/1948 | Sterrett | 260—45.9 |
| 2,651,620 | 9/1953 | Hill et al. | 260—45.9 |
| 2,654,679 | 10/1953 | Goppel et al. | 260—45.9 |
| 2,766,219 | 10/1956 | Beaver et al. | 260—45.9 |
| 3,024,218 | 3/1962 | Stevens | 260—45.9 |
| 3,124,543 | 3/1964 | Fowler et al. | 260—45.9 |
| 2,583,370 | 1/1952 | Goppel et al. | |
| 2,900,357 | 8/1959 | Ayers et al. | 260—33.6 |
| 3,196,126 | 7/1965 | Wald | 260—33.6 |
| 3,389,115 | 6/1968 | Childers | 260—33.6 |

MAURICE J. WELSH, Primary Examiner

E. C. RZUCIDLO, Assistant Examiner

U.S. Cl. X.R.

260—45.8 N, 45.8 NZ, 45.9 R